July 6, 1937.    J. A. HENRICKS, JR    2,085,747
ADDITION AGENT
Filed July 30, 1934
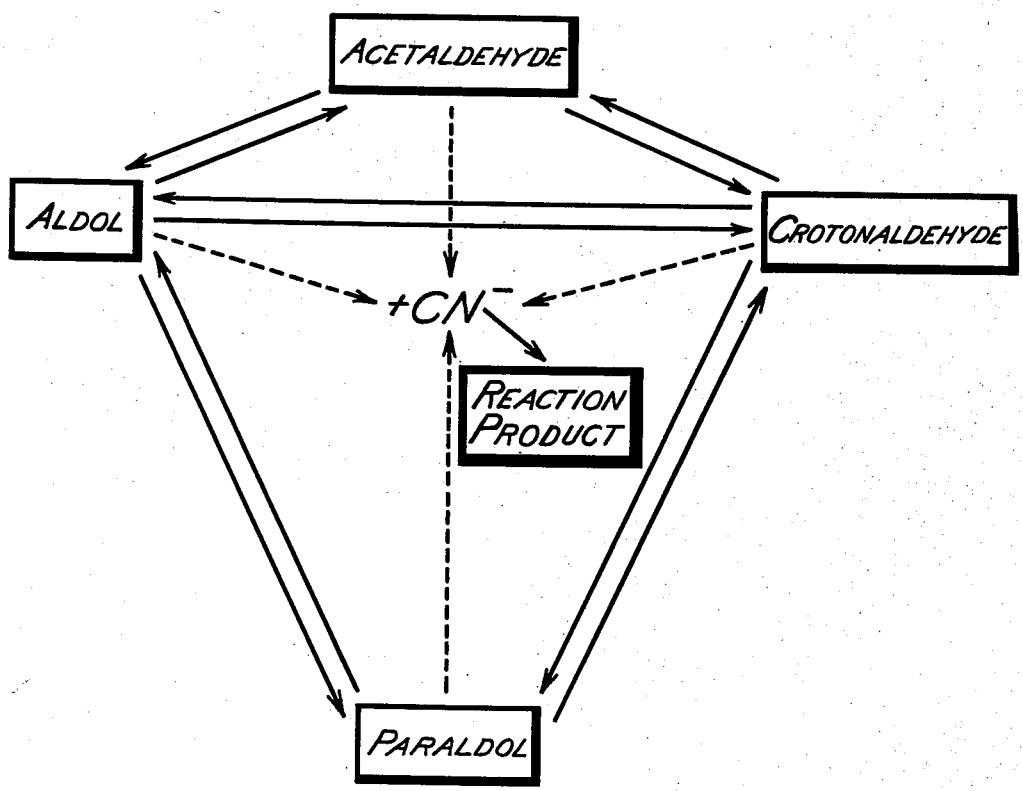
INVENTOR.
JOHN A. HENRICKS
BY
Albert B. Griggs.
ATTORNEY.

Patented July 6, 1937

2,085,747

UNITED STATES PATENT OFFICE 2,085,747

ADDITION AGENT

John A. Henricks, Jr., Chicago, Ill., assignor, by mesne assignments, to E. I. du Pont de Nemours & Company, Wilmington, Del., a corporation of Delaware Application July 30, 1934, Serial No. 737,610

15 Claims. (Cl. 204—.1)

This invention relates to certain novel compositions of matter, to plating baths containing them, and to processes of cadmium plating employing them. My invention is particularly directed to the use of cyaldacets as addition agents in cadmium plating whereby a cadmium deposit of greatly improved, uniform brightness is obtained.

My novel compositions of matter are obtained by treating an aldacet such as, acetaldehyde, aldol, crotonaldehyde, paraldol, etc., with an alkali metal cyanide solution. This reaction product is preferably treated with dilute sulfuric acid to neutralize the solution. A viscous liquid, dark red in color, rises to the top and may be separated from the remainder of the solution. This material constitutes my preferred product, though, as will appear hereinafter, the acetaldehyde, aldol, croton aldehyde, etc. and their reaction products with alkali metal cyanides may be employed in certain relations as substantially equivalent to my preferred product.

The materials acetaldehyde, aldol, crotonaldehyde, and paraldol, above mentioned, represent my preferred starting materials. At first glance these substances may not appear to belong in the same chemical genus, but, in fact, they are very closely related chemically for in cyanide solution each may reversibly be converted to another. Acetaldehyde in dilute alkali metal cyanide solution quickly changes to aldol, thus:

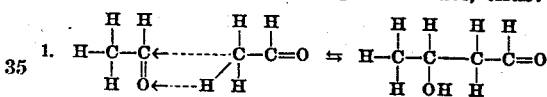

The aldol may lose one molecule of water and become crotonaldehyde, thus:

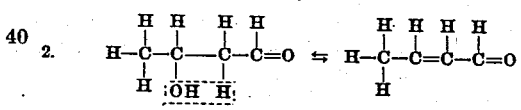

The aldol may condense to form paraldol, thus:

3. 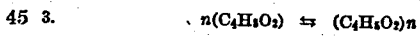

The $n$ in Equation 3 is a whole number, probably 2.

In order to visualize the relationships existing between the listed materials, reference should be had to the accompanying drawing wherein their relationships are diagrammatically illustrated. It is understood that the relationships are shown with reference to the compounds in dilute alkali metal cyanide solutions.

In the drawing acetaldehyde is illustrated as converting to aldol. The aldol may go to paraldol or to crotonaldehyde. The aldol might also go back to acetaldehyde, but only to a small extent. The paraldol may go back to aldol, or it may lose water and go to crotonaldehyde, though this latter conversion probably takes place to a very small degree. The crotonaldehyde may form from acetaldehyde, aldol, or paraldol, and, by gaining water, may revert to any of them, though it is likely that it would move largely by way of aldol.

As seen in the drawing, we may consider the acetaldehyde, aldol, crotonaldehyde, and paraldol as being in some kind of equilibrium. This equilibrium will, according to my belief, be substantially the same regardless of which of the four substances are added initially to the cyanide solution.

The reaction which leads to my preferred products takes place, I believe, between CN⁻ and one or more of the four materials to produce a reaction product. This is illustrated in the drawing by dashed lines. The material, or materials, which act with the cyanide may go first to some other and unknown form and then react. In any event, I conceive of the reaction as withdrawing one, or more, of the four materials from the equilibrium with the result that the remaining materials move towards the removed materials to restore the equilibrium and are so all finally utilized.

I have reason to believe that two or more of the materials in equilibrium react with cyanide to produce the final product, or else the one which reacts with the cyanide moves through a number of different paths to produce a number of final products. This is evidenced by the fact that the reaction product is a mixture of separable materials. More is said of this separability hereafter.

I have mentioned only acetaldehyde, aldol, crotonaldehyde and paraldol as members of this sub-genus, but obviously I may use any condensation product of acetaldehyde in dilute alkali metal cyanide solution. Another member of this genus is paraldehyde. Ordinarily paraldehyde is considered as forming only in acid solution, but I have reason to believe that at least some paraldehyde forms in the discussed equilibrium. Paraldehyde is very slow to convert to other members of this genus and because of this fact is none too satisfactory a starting material. The term "condensation product" is used to refer to the products which form from acetaldehyde in cyanide solution without a true reaction with the cyanide. Aldol, acetaldehyde, crotonaldehyde, and paraldol are the only commercially available members of this sub-genus at the present time. For practical reasons, therefore, I prefer to use as a starting material an aldehyde selected from the group consisting of acetaldehyde, aldol, crotonaldehyde, and paraldol.

Broadly, I use as a starting material an aldehyde from the group consisting of acetaldehyde and its condensation products in alkali metal cyanide solution. This expression of this sub-genus of aldehydes is more aptly put: an acetaldehyde condensation product in alkali metal cyanide solution. This generic expression includes acetaldehyde, aldol, crotonaldehyde, paraldol, and other such products, since, as above discussed, some or all of these form when acetaldehyde is put in cyanide solution. As I am the first to recognize this sub-genus of the broad group of aldehydes, or at least the first to recognize their great importance, I have assumed the usual prerogative and named the genus "aldacet". The aldacets include acetaldehyde, aldol, crotonaldehyde, paraldol, and the other products which form in alkali metal cyanide solutions by condensation of acetaldehyde as above fully described.

It will be noted hereinafter that the starting materials are not entirely equivalent, but are substantially so. Crotonaldehyde, for example, seems to lead to slightly lower yields. This may be attributable to the fact that crotonaldehyde is but slowly converted to the necessary form, or to some other, now unknown, cause.

As is above indicated, there is considerable uncertainty as to the extent and nature of the conversion of some aldacets to others. All of the evidence now available to me substantiates the putative theory above advanced as to the nature of the aldacet equilibrium, but it will be understood that direct experimental evidence is obtainable only with great difficulty. In most instances the aldacet equilibrium exists for only a short time, going quickly to the cyanide reaction product, and it is, therefore, very difficult to determine, quantitatively, the conditions which obtain. The fact that the aldacets are in some kind of equilibrium is relatively certain, but the proportions of individual aldacets and the rate of conversion has, to date, defied exact determination.

It is to be clearly understood that the above description of the relations between the initial materials is for purposes of illustration, and I do not intend to be limited in any way thereby because the chemistry of these compounds is intricate and obscure and because my results are obtained entirely apart from theoretical considerations. It is also to be understood that while I refer to aldol, crotonaldehyde, etc. as resulting from the condensation of acetaldehyde in cyanide solution, I do not wish to be limited thereby, as I may use aldol, crotonaldehyde, etc. which have been made by any process.

Turning now to a consideration of the products formed by the reaction of the above discussed starting materials with a cyanide, it is first noted that the term "reaction" is selected to express whatever occurs in the treatment of the starting materials with cyanide under the conditions to be discussed hereinafter. The term "reaction" is used to distinguish from "condensation" as used above, though, in fact, the "reaction" may include both polymerizations and condensations.

The reaction products of my invention contain nitrogen, as determined by the Kjeldahl method, in about the ratio of one nitrogen atom to each two molecules of aldol. (Four of acetaldehyde, one of paraldol, etc.) This nitrogen is probably attached to a carbon group which in turn is attached to a carbon group, C—CN, but insufficient evidence is available to assure the presence of a CN⁻ group.

My products are not simple compounds, but are mixtures, as is evidenced by the fact that portions are water soluble, other portions chloroform soluble, etc. It seems probable that my products are the result of many intricate polymerizations, condensations, and reactions with cyanide. There may be some condensation products which are not combined with nitrogen, but the fact that molecular proportions, or an excess, of alkali metal cyanide to aldehyde give the best results leads to the belief that the amount of such uncombined products is relatively small. I shall refer to the product of these condensations, polymerizations, and reactions as cyanide reaction products.

The aldacets and their reaction products with cyanide are very closely related in their physical and chemical properties, varying much after the manner of a homologous series. I have accordingly conferred the name "cyaldacets" upon the genus which includes acetaldehyde and its condensation products in alkali metal cyanide solutions, and the reaction products of acetaldehyde and such condensation products with alkali metal cyanide solutions. In other words, the cyaldacets include the aldacets and alkali metal cyanide reaction products of the aldacets. The drawing clearly shows the relationships among the cyaldacets broadly. The aldacets probably move through higher aldacets and then react with CN⁻. The whole group shown in the drawing, including the aldacets, comprise the genus cyaldacet.

I do not intend, of course, to be in any way limited by the above conjectures as to the nature of the reaction and the nature of the products.

The nature of my novel substances may be best appreciated by a consideration of the following specific example showing one mode of preparation wherein aldol is employed.

*Example 1.*—Five parts, by weight, of technical aldol were added to a solution containing three parts, by weight, of sodium cyanide in ten parts, by weight, of water. The reaction receptacle, to which the aldol was added, was provided with a water cooling means, and convenient means were provided for heating the receptacle as required. By adding the aldol slowly and employing the cooling means, the temperature of the reaction mixture was held between 45° to 50° C. This temperature was maintained for about two and one-half hours, cooling or heating the receptacle as required. As the aldol was added, and for a time thereafter, the heat of the reaction necessitated a continuous cooling of the reaction mixture to hold the temperature within the desired limits. Later it became necessary to supply heat to the reaction mixture to maintain the temperature. During the reaction a small amount of ammonia was liberated, as was evidenced by the characteristic odor.

The reaction mixture obtained constitutes one product of my invention. It is a thick, mobile liquid, dark red in color.

In order to purify and concentrate this product, the solution, after cooling, was made neutral to litmus with a dilute solution of sulfuric acid. The acid solution consisted of one part by volume of water to one part by volume of concentrated sulfuric acid. There was then added an excess of ten per cent over the volume of dilute acid required to neutralize the solution. Sodium sulfate was precipitated, and the excess acid used depressed its solubility. The temperature was not allowed to go above 50° C. during this neutralization treatment. Hydrocyanic acid gas was evolved during the treatment and means were provided for disposing of it.

The acid treated solution was allowed to stand for several hours and a dark red fraction rose to the top. This top layer was removed and centrifuged.

The separated top layer, which constitutes my preferred product, is a viscous liquid, dark red in color, and has a specific gravity of about 1.20. At temperatures as low as −17° C. it remains liquid, but at the temperature produced with a freezing mixture of solid carbon dioxide and acetone (below −80° C.) a brittle solid, apparently non-crystalline, is formed. My product is substantially insoluble in such solvents as ether, benzene, and petroleum ether. It is, however, completely soluble in alcohol and acetone.

My product is entirely soluble in cyanide plating baths up to about three grams per liter. One characteristic of both the final product and the unseparated reaction mixture is that, when used in cyanide cadmium plating baths, they exhibit the property of causing a bright deposit of cadmium. This characteristic serves admirably for the identification of my novel products.

A part of my product is water soluble, and a smaller part is chloroform soluble. When used as an addition agent in electroplating cadmium, the water soluble portion exhibits the property of promoting the formation of a bright finish on recessed parts of an article. The water insoluble portion seems to exercise its major influence on the brightness of the less recessed parts of the article. The chloroform soluble fraction is very active as an addition agent, but when used alone is not satisfactory as it causes streaks and stains on the plated article.

The temperature of the reaction is relatively important as the yield of the product and its activity as an addition agent seem to be greatly influenced thereby. The best results seem to be obtained with temperature between 45 and 50° C. as used in Example 1. Lower temperatures may be used with a decrease in the activity of the product as an addition agent. Below about 30° C. the product rapidly becomes less active with decreases in temperature. If temperatures substantially above 50° C. are used the yield of active material is smaller. At about 75° C., for instance, about one-half of the product is an insoluble resin without much value as an addition agent. Generally, I may use temperatures from about 30° C. to about 75° C., though specifically I prefer to keep the reaction temperature between about 45° and 50° C. The separation by neutralization with acid was accomplished at 50° C., but rigid temperature control is not necessary. Apparently, as soon as the reaction is complete, the reaction product may be heated to rather high temperatures without substantial damage resulting.

In the examples, sulfuric acid is employed for removing excess sodium cyanide by converting it to sodium sulfate which can then be salted out. Obviously other acids can be used which lead to a similar result, and moreover, still other means for removing the excess sodium cyanide will readily occur to those working in the art.

While I may use any of the aldacets as a starting material, I prefer to use aldol because it is readily obtainable commercially at the present time and because it leads to somewhat higher yields than do some of the other aldacets, crotonaldehyde and paraldehyde, for instance. Aldol is also advantageous by reason of its being less volatile than acetaldehyde and more easily handled than paraldol which is a solid.

As an example of the use of another aldacet I give the following:

*Example 2.*—80 parts by weight of acetaldehyde was added slowly to 100 parts by weight of water containing 20 parts by weight of sodium cyanide. The temperature was held between 40° and 50° C. for about one-half hour, at the end of which time the product was allowed to cooled.

This solution constitutes one product of my invention.

The reaction mixture is preferably concentrated by treatment with dilute sulfuric acid, as described in Example 1. The product is substantially identical with the concentrated product of Example 1 described in detail above.

It is noted that in Example 2 a smaller ratio of cyanide to aldehyde was used than in Example 1. This seems to lower the yield of active material somewhat. Generally, the best results are obtained when the aldehyde and cyanide are used in substantially molecular proportions, but a latitude is permissible. If less of the alkali metal cyanide be used, the product will be less active, while if an excess of alkali metal cyanide be used, no particular damage results. When the product is concentrated by neutralizing with dilute sulfuric acid, the excess of cyanide, over that required to form the reaction product, is converted to alkali sulfate and hydrocyanic gas, both of which are separated from the product.

The period of time during which the reaction temperature is maintained may be widely varied. If the time be too short, the reaction will not be complete and the product will be of low activity when used as an addition agent for cadmium plating. The time of Example 2 represents a practical minimum and I usually prefer a longer period. In general the reaction temperature should be maintained for not less than one-half hour, and specifically I prefer to maintain it for not less than four hours.

The preferred use of my novel compositions of matter is as addition agents in cadmium plating baths.

While my addition agents are effective in any customary cyanide bath, I prefer to use baths of the kind set forth in U. S. Patent 1,681,509, to Mr. Leon R. Westbrook. These baths are of the cyanide type, and contain a small amount of a compound of a metal of the iron group having an atomic weight greater than fifty-eight. The details as to the formulation and use of these baths may be found in the said Patent 1,681,509, and need not be duplicated here.

The plating baths of the said Patent 1,681,509 are modified only by employing my novel addition agents in lieu of the addition agents, goulac, dextrine, starch, etc., mentioned therein. While the plating processes described in the said Patent 1,681,509 lead to a bright, hard, dense, and smooth deposit of cadmium, and while the invention therein described and claimed has been widely accepted by the art because of its merit, the substitution of my addition agents for those in the patent results in a cadmium deposit of even greater smoothness, uniformity, and brightness.

As a specific example of my preferred plating bath and practice, the following is given:

*Example 3.*—The concentrated product of Example 1 was used as an addition agent, and a bath of the following formula was made up:

| | Grams per liter |
|---|---|
| Sodium cyanide (NaCN) | 130 |
| Cadmium oxide (CdO) | 43 |
| Sodium sulfate ($Na_2SO_4$) | 50 |
| Cobalt sulfate ($CoSO_4.7H_2O$) | 10 |
| Addition agent | 1.4 |

About one-hundred and ninety liters of plating solution were made up and used in the customary way to plate some large, flat articles, several square feet in area, with a cadmium deposit about five-thousandths of an inch thick. After washing with water the articles were examined, and found to have a perfectly smooth, mirror finish. It is, of course, very difficult with prior art processes to obtain even a fairly smooth finish when so thick a deposit of cadium is plated.

The addition agent may be used in various amounts, but I generally prefer to use between about eight-tenths to two grams per liter. The amount given, one and four-tenths grams per liter, is about an optimum quantity of the concentrated product.

Of course, I may use other compounds of metals of the iron group having an atomic weight greater than fifty-eight, such as nickel, copper, etc., as disclosed in the heretofore mentioned Patent 1,681,509, but my best results have been obtained using cobalt compounds.

Instead of using the concentrated addition agent of Example 1 in the bath, I may, of course, use any of the novel products heretofore mentioned.

As has already been noted, my addition agents are divisible into two portions, one of which acts to produce a bright finish in recessed portions, the other in the less recessed portions. Apparently, my process of manufacture and the nature of the reaction leads to an agent which contains the proper ratio of the two portions to produce a uniformly bright finish. If one of my products should display too little brightening action in the recessed portions, a little of the water soluble fraction would restore the proper balance. Likewise, some of the water insoluble portion may be added to an agent which displays too little activity on the less recessed portions. This modification has little application as far as my novel addition agents are concerned, for so far none have produced criticizable results and it is only by treating with water that I have been able to obtain unbalanced mixtures. However, the water soluble, or water insoluble fractions may be used alone, or together with prior art addition agents to improve their performance.

The removal of the chloroform soluble portion is in the nature of a purification of my product, though no appreciably different results are noted whether it is left in the mixture or taken out.

The solution obtained by the reaction of an aldacet with an alkali metal cyanide constitutes, without further treatment, a product of my invention. The following examples illustrate the use of this less concentrated product:

*Example 4.*—The product of Example 1, obtained by reacting aldol and sodium cyanide, was used as an addition agent in a bath of the following formulation:

| | Grams per liter |
|---|---|
| Sodium cyanide (NaCN) | 130 |
| Cadmium oxide (CdO) | 43 |
| Sodium sulfate ($Na_2SO_4$) | 50 |
| Cobalt sulfate ($CoSO_4.7H_2O$) | 10 |
| Addition agent | 5 |

When used as a plating solution this bath gave excellent results.

It is noted that less of the more concentrated agent was used in Example 3, but the amounts used in each case represent the amount of product produced by substantially equivalent amounts of aldol.

*Example 5.*—The product of Example 2 which resulted from the reaction of acetaldehyde and sodium cyanide was used as an addition agent in the following formulation:

| | Grams per liter |
|---|---|
| Sodium cyanide (NaCN) | 120 |
| Cadmium hydroxide ($Cd(OH)_2$) | 50 |
| Sodium sulfate ($Na_2SO_4$) | 60 |
| Nickel sulfate ($NiSO_4.7H_2O$) | 1 |
| Addition agent | 2 |

When used as a plating bath, this solution produced uniformly bright, mirror finished cadmium deposits.

I have attempted to make satisfactory addition agents by causing the condensation of the heretofore mentioned aldehydes in alkaline solution, without cyanide, but the products are of small value as addition agents. In sodium hydroxide solution, for example, an insoluble resin was formed, and in weak sodium carbonate solutions an insoluble oil resulted. For a while I used a procedure wherein the aldehyde was first treated with a sodium cyanide solution and subsequently treated with sodium carbonate solution. About half of the yield was an insoluble resin, but the remainder was quite efficient as an addition agent. I may accordingly, make the product in this way, though it is substantially the same as those heretofore described and this process leads to lower yields.

Any of the cyaldacets operate as addition agents, so, instead of making addition agents as separate materials, as above described, I may add the aldehydes to a cyanide plating bath. This is not as efficient as my above described methods, because the optimum conditions of temperature, concentration, etc. cannot be practically obtained. Though excellent results are obtained by the direct addition of aldacets, the pretreated products are the most satisfactory. The addition of a substance from the group consisting of acetaldehyde and its condensation products in weakly alkaline solution to a cyanide bath results, I believe, in the formation of one of the novel products of my invention, though perhaps rather slowly and incompletely. As in the use of my novel products, I prefer to use the addition of aldacets in connection with the baths of the heretofore mentioned Patent 1,681,509.

As an example of the use of an aldacet directly the following is given:

Example 6

| | Grams per liter |
|---|---|
| Sodium cyanide (NaCN) | 120 |
| Cadmium oxide (CdO) | 45 |
| Sodium sulfate (Na$_2$SO$_4$) | 60 |
| Nickel sulfate (NiSO$_4$.7H$_2$O) | 1 |
| Aldol | 17 |

This bath gave very good results.

Instead of aldol I may, of course, use any of the aldacets.

I desire that it be clearly understood that the whole disclosure of the heretofore mentioned Patent 1,681,509, as well as that of U. S. 1,564,413, to Clayton M. Hoff, cited therein, is to be considered, in its entirety, as an integral part of my disclosure, as my novel addition agents co-act with the cyanide-metal compound baths therein to produce a result unexpected from an examination of the attributes of either my addition agents or the baths of the said patent, for, as will presently appear, baths of such high concentration cannot be used to advantage without the metal compounds added by Westbrook.

I have discussed above the use of baths of the Westbrook type, but I do not wish to be limited thereto. I prefer to use them because of certain commercial considerations, and because they may be more concentrated, but excellent results are obtainable with other types of baths.

As an example, using the concentrated product of Example 1, note the following:

Example 7

| | Grams per liter |
|---|---|
| Cadmium oxide | 26 |
| Sodium cyanide | 87 |
| Addition agent | 0.7 |

This bath was used for plating several objects at a current density of twenty amperes per square foot. The deposit was extremely bright and smooth. The number of grams and cadmium oxide in the above example may be varied between fifteen and thirty-five and good results are obtained. If the bath be too concentrated the deposit may not be entirely satisfactory.

In baths of the above type the addition agent is preferably used in amounts equivalent to between five-tenths and seventy-five hundredths grams per liter of the agent above used.

As an example of another bath of the same type, using the addition agent obtained in Example 1 before concentrating, I give the following:

Example 8

| | Grams per liter |
|---|---|
| Cadmium oxide | 25 |
| Sodium cyanide | 120 |
| Addition agent | 3 |

Excellent results were obtained with this bath. In this bath the number of grams per liter of cadmium oxide may vary between fifteen and forty and excellent results will still be obtained.

In order conveniently to merchandise my novel materials, the addition agents may be incorporated with, and adsorbed upon, the other ingredients in dry form. The resulting dry mixture can then be packaged and sold to the consumer who needs only to dissolve the mixture in water for use. Again, I may find it desirable to incorporate the addition agent with only one or a few of the ingredients and let the consumer add the other ingredients. Frequently, of course, it will be desirable to merchandise the novel addition agent as such.

While the term "aldacet" is fully defined above, for purposes of more precise definition, it is noted that the aldacets are the equilibrium products which result when acetaldehyde is put in alkaline solution in contradistinction to the irreversible condensation or polymerization products which result, all as set forth above.

I have given a large number of specific examples, specific conditions, and specific limitations above, but I do not wish to be restricted thereby, the scope of my invention being set forth in the appended claims.

I claim:

1. A cyanide-cadmium plating composition to which has been added an aldehyde selected from the group consisting of acetaldehyde, aldol, crotonaldehyde, and paraldol.

2. A cyanide-cadmium plating composition to which has been added aldol.

3. A cyanide-cadmium plating composition to which has been added an addition agent comprising the reaction product of an aldehyde selected from the group consisting of acetaldehyde, aldol, crotonaldehyde, and paraldol with sodium cyanide.

4. A cyanide-cadmium plating composition to which has been added an addition agent comprising the product obtained by reacting an aldehyde selected from the group consisting of acetaldehyde, aldol, crotonaldehyde, and paraldol with an alkali metal cyanide at a temperature from about 30 to 70° C.

5. A cyanide-cadmium plating composition to which has been added an addition agent comprising the product obtained by reacting an aldehyde selected from the group consisting of acetaldehyde, aldol, crotonaldehyde, and paraldol with an alkali metal cyanide at a temperature from about 45 to 50° C.

6. A cyanide-cadmium plating composition to which has been added an addition agent comprising the product obtained by reacting a substance selected from the group consisting of acetaldehyde, aldol, crotonaldehyde, and paraldol with sodium cyanide, the composition being a dark red, viscous liquid with a specific gravity of about 1.2, a solidifying temperature below −17° C., being soluble in alcohol and acetone, insoluble in ether, benzene, and petroleum ether, and partially soluble in chloroform and in water.

7. A cyanide-cadmium plating composition to which has been added an addition agent comprising the product obtained by reacting aldol with sodium cyanide, the composition being a dark red, viscous liquid with a specific gravity of about 1.2, a solidifying temperature below −17° C., and being soluble in alcohol and in acetone, insoluble in ether, benzene, and petroleum ether, and partially soluble in chloroform and in water.

8. In a process for the electrodeposition of cadmium, the step comprising electrodepositing cadmium from a cyanide-cadmium bath to which has been added an aldehyde selected from the group consisting of acetaldehyde, aldol, crotonaldehyde, and paraldol.

9. In a process for the electrodeposition of cadmium, the step comprising electrodepositing cadmium from a cyanide-cadmium bath to which has been added aldol.

10. In a process for the electrodeposition of cadmium, the step comprising electrodepositing cadmium from a cyanide-cadmium bath to which has been added a reaction product of an aldehyde selected from the group consisting of acetaldehyde, aldol, crotonaldehyde, and paraldol with an alkali metal cyanide.

11. In a process for the electrodeposition of cadmium, the step comprising electrodepositing cadmium from a cyanide-cadmium bath to which has been added a reaction product of aldol with an alkali metal cyanide.

12. A cyanide-cadmium plating composition to which has been added an addition agent comprising the reaction product of an aldacet with an alkali metal cyanide, an aldacet being, as herein set forth, one of the aldehyde equilibrium products which result when acetaldehyde is put in alkali metal cyanide solution.

13. A cyanide-cadmium plating composition to which has been added an addition agent comprising a cyaldacet, a cyaldacet being, as herein set forth, one of the products which result when acetaldehyde is put in sodium cyanide solution.

14. In a process for the electrodeposition of cadmium, the step comprising electrodepositing cadmium from a cyanide-cadmium bath to which has been added a cyaldacet, a cyaldacet being, as herein set forth, one of the products which result when acetaldehyde is put in sodium cyanide solution.

15. In a process for the electrodeposition of cadmium, the step comprising electrodepositing cadmium from a cyanide-cadmium bath to which has been added a small amount of a compound of a metal of the iron group having an atomic weight greater than 58 and a cyaldacet, a cyaldacet being, as herein set forth, one of the products which result when acetaldehyde is put in sodium cyanide solution.

JOHN A. HENRICKS, Jr.